(12) United States Patent
Oda (10) Patent No.: US 11,456,461 B2
(45) Date of Patent: Sep. 27, 2022

(54) CLAD MATERIAL FOR BATTERY CURRENT COLLECTOR AND METHOD FOR MANUFACTURING CLAD MATERIAL FOR BATTERY CURRENT COLLECTOR

(71) Applicant: HITACHI METALS, LTD., Tokyo (JP)

(72) Inventor: Yoshimitsu Oda, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 67 days.

(21) Appl. No.: 16/768,530

(22) PCT Filed: Nov. 20, 2018

(86) PCT No.: PCT/JP2018/042861
§ 371 (c)(1),
(2) Date: May 29, 2020

(87) PCT Pub. No.: WO2019/107223
PCT Pub. Date: Jun. 6, 2019

(65) Prior Publication Data
US 2021/0194010 A1    Jun. 24, 2021

(30) Foreign Application Priority Data

Dec. 1, 2017 (JP) .............................. JP2017-231363
May 17, 2018 (JP) .............................. JP2018-095726

(51) Int. Cl.
*B32B 15/01* (2006.01)
*H01M 4/66* (2006.01)
(52) U.S. Cl.
CPC .......... *H01M 4/662* (2013.01); *B32B 15/012* (2013.01); *B32B 15/017* (2013.01); *H01M 4/667* (2013.01);
(Continued)

(58) Field of Classification Search
None
See application file for complete search history.

(56) References Cited

U.S. PATENT DOCUMENTS 10,381,650 B2 * 8/2019 Oda ................... H01M 4/662
2008/0292963 A1   11/2008 Horie et al.
(Continued)

FOREIGN PATENT DOCUMENTS

JP    H06-070159 U    9/1994
JP    2002-075455 A   3/2002
(Continued)

OTHER PUBLICATIONS

International Search Report for PCT/JP2018/042861 dated Feb. 26, 2019.
(Continued)

*Primary Examiner* — Daniel J. Schleis
(74) *Attorney, Agent, or Firm* — Millen White Zelano and Branigan, PC; Csaba Henter (57) ABSTRACT

A clad material for a battery current collector includes a pinhole due to falling off of an intermetallic compound containing Al and Ni or an intermetallic compound containing Al and Fe from an outer surface of a first layer. A clad material for a battery current collector includes a clad material obtained by bonding a first layer made of Al or an Al alloy and a second layer made of any one of Ni, a Ni alloy, Fe, and a Fe alloy by rolling. The clad material has a thickness of 50 μm or less. In the clad material, an intermetallic compound layer constituted by an intermetallic compound containing Al and Ni or an intermetallic compound containing Al and Fe, the intermetallic compound layer having a thickness of 0.1 μm or more and 1 μm or less, is formed between the first layer and the second layer.

7 Claims, 5 Drawing Sheets

(52) U.S. Cl.
CPC ....... *B32B 2311/22* (2013.01); *B32B 2311/24* (2013.01); *B32B 2311/30* (2013.01); *B32B 2457/10* (2013.01)

(56) References Cited

U.S. PATENT DOCUMENTS

| | | |
|---|---|---|
| 2014/0170451 A1 | 6/2014 | Harada et al. |
| 2015/0349347 A1 | 12/2015 | Funamoto et al. |
| 2016/0308198 A1 | 10/2016 | Oda et al. |
| 2017/0162877 A1 | 6/2017 | Funamoto et al. |

FOREIGN PATENT DOCUMENTS

| | | | |
|---|---|---|---|
| JP | 2004164865 | A | 6/2004 |
| JP | 2004351460 | A | 12/2004 |
| JP | 2006051523 | A | 2/2006 |
| JP | 2009-004363 | A | 1/2009 |
| JP | 2010-262866 | A | 11/2010 |
| JP | 5205713 | B2 | 6/2013 |
| JP | 2014120399 | A | 6/2014 |
| JP | 2015-225847 | A | 12/2015 |
| JP | 2015225847 | A * | 12/2015 |

OTHER PUBLICATIONS

English Machine Translation for JPH06-070159, Publication Date: Sep. 30, 1994.
English Machine Translation for JP2010-262866, Publication Date: Nov. 18, 2010.
English Machine Translation for JP5205713, Publication Date: Jun. 5, 2013.
English Machine Translation for JP2002-075455, Publication Date: Mar. 15, 2002.
English Machine Translation for JP2004164865, Publication Date: Jun. 10, 2004.
English Machine Translation for JP2004351460, Publication Date: Dec. 16, 2004.
English Machine Translation for JP2006051523, Publication Date: Feb. 23, 2006.
Office Action in corresponding JP application 2019-557169 dated Jun. 1, 2020 (pp. 1-4) and english translation (pp. 1-6).
Extended European Search Report dated Jun. 23, 2021 in the corresponding European application No. 18883569.8. (pp. 1-8).

* cited by examiner

FIG. 1

ROLLING DIRECTION

Clad Material for Battery Current Collector and Method for Manufacturing Clad Material for Battery Current Collector

TECHNICAL FIELD

The present invention relates to a clad material for a battery current collector and a method for manufacturing the clad material for a battery current collector.

BACKGROUND ART

In general, a bipolar secondary battery using a clad material including a first layer made of Al for a battery current collector is known. Such a bipolar secondary battery is disclosed in Japanese Patent No. 5205713, for example.

Japanese Patent No. 5205713 discloses a clad material for a battery current collector, including a first layer made of Al and a second layer made of Cu or Ni between a positive electrode active material layer and a negative electrode active material layer in a bipolar secondary battery.

PRIOR ART DOCUMENT

Patent Document

Patent Document 1: Japanese Patent No. 5205713

SUMMARY OF THE INVENTION

Problems to be Solved by the Invention

However, when the second layer is made of Cu in the clad material for a battery current collector described in Japanese Patent No. 5205713, there is a disadvantage that Cu of which the second layer is made is broken such that a pinhole is easily formed when the thickness of the clad material is tried to be reduced to a thickness suitable for the battery current collector by rolling, for example. Therefore, the inventor has examined the use of Ni or Fe, which is harder and has higher mechanical strength, for the second layer of the clad material for a battery current collector instead of soft Cu.

In addition, the inventor has examined that the thickness of the clad material for a battery current collector is further reduced (50 μm or less, for example) because the second layer using Ni or Fe is considered to be harder and unlikely to be broken. For example, when a clad material having a thickness reduced to 50 μm or less, which appears to be a very small thickness for rolling, is produced, generally, a clad material (intermediate clad material) having a certain thickness is produced once, and then rolling is further performed to reduce the thickness of the clad material to 50 μm or less. Furthermore, Ni and Fe are generally less likely to be plastically deformed than Al, and thus annealing is performed on an intermediate clad material at an annealing temperature equal to or higher than the recrystallization temperature of Ni or Fe before rolling to 50 μm or less. Thus, it is conceivable that Ni or Fe is preferably softened to perform rolling.

However, when rolling is further performed after annealing to reduce the thickness of the clad material for a battery current collector to 50 μm or less, for example, an intermetallic compound containing Al and Ni or an intermetallic compound containing Al and Fe, which is formed during annealing, may be exposed on the outer surface of the first layer made of Al having lower mechanical strength and having a reduced thickness, and fall off such that a pinhole is formed. The inventor has found that due to the pinhole formed in this manner, the second layer made of Ni or Fe may be exposed on the outer surface side of the first layer. In this case, when a positive electrode active material layer and a negative electrode active material layer appropriate for a bipolar secondary battery are arranged on both outer surfaces of the clad material for a battery current collector, for example, due to direct contact of the exposed second layer with both the positive electrode active material layer and the negative electrode active material layer, Ni or Fe of which the second layer is made may be dissolved during charging and discharging of the battery.

From the viewpoint of significantly reducing or preventing formation of a pinhole, it is also conceivable that another metal layer such as SUS or Ti is separately provided between Al and Ni or Fe in order to significantly reduce or prevent formation of the intermetallic compound containing Al and Ni or the intermetallic compound containing Al and Fe. However, from the viewpoint of reducing the thickness of the clad material, another metal layer is inserted between Al and Ni or Fe such that it is necessary to further reduce the thicknesses of Al and Ni or Fe and it is also necessary to reduce the thickness of another metal layer itself, and thus it is not easy to reduce the thickness to 50 μm or less.

Therefore, the present invention has been proposed in order to solve the aforementioned problems, and an object of the present invention is to provide a clad material for a battery current collector and a method for manufacturing the clad material for a battery current collector in which formation of a pinhole due to falling off of an intermetallic compound containing Al and Ni and having appropriate mechanical strength or an intermetallic compound containing Al and Fe and having appropriate mechanical strength from the outer surface of a first layer can be significantly reduced or prevented even when the thickness of the clad material for a battery current collector is reduced to 50 μm or less.

Means for Solving the Problems

A clad material for a battery current collector according to a first aspect of the present invention includes a clad material obtained by bonding a first layer made of Al or an Al alloy and a second layer made of any one of Ni, a Ni alloy, Fe, and a Fe alloy by rolling, the clad material having a thickness of 50 μm or less, and in the clad material, an intermetallic compound layer constituted by an intermetallic compound containing Al and Ni or an intermetallic compound containing Al and Fe, the intermetallic compound layer having a thickness of 0.1 μm or more and 1 μm or less, is formed between the first layer and the second layer. Note that the "Al alloy" refers to an alloy mainly including Al by containing 50 mass % or more of Al (aluminum). Furthermore, the "Ni alloy" refers to an alloy mainly including Ni by containing 50 mass % or more of Ni (nickel). In addition, the "Fe alloy" refers to an alloy mainly including Fe by containing 50 mass % or more of Fe (iron). The content percentage of the elements described in this specification are described in mass % unless otherwise specified.

In the clad material for a battery current collector according to the first aspect of the present invention, as described above, the thickness of the intermetallic compound layer constituted by the intermetallic compound is set to 1 μm or less. Accordingly, even when the clad material for a battery current collector includes the clad material having a thickness of 50 μm or less such that the thickness of the first layer made of Al or an Al alloy is reduced, the thickness of the intermetallic compound layer is 1 µm or less, which is sufficiently small, and thus exposure of the hard intermetallic compound on the outer surface can be significantly reduced or prevented. Consequently, in the clad material for a battery current collector using the second layer made of any one of Ni, a Ni alloy, Fe, and a Fe alloy having appropriate mechanical strength, even when the thickness is reduced to 50 µm or less, formation of a pinhole on the first layer due to falling off of the intermetallic compound from the outer surface can be significantly reduced or prevented. Therefore, exposure of the second layer made of any one of Ni, a Ni alloy, Fe, and a Fe alloy on the outer surface of the first layer due to such a pinhole can be significantly reduced or prevented, and thus when a positive electrode active material layer and a negative electrode active material layer appropriate for a bipolar secondary battery are arranged on both outer surfaces such that the clad material for a battery current collector is used for an electrode, for example, direct contact of the exposed second layer with both the positive electrode active material layer and the negative electrode active material layer can be significantly reduced or prevented. Consequently, dissolution of the metal (Ni, a Ni alloy, Fe, or a Fe alloy) of which the second layer is made, which may occur during charging and discharging of the battery, can be prevented.

In the clad material for a battery current collector according to the first aspect of the present invention, as described above, the thickness of the intermetallic compound layer constituted by the intermetallic compound is set to 0.1 µm or more such that an excessive decrease in the bonding strength between the first layer and the second layer due to an insufficient amount of formed intermetallic compound layer can be significantly reduced or prevented.

The aforementioned clad material for a battery current collector according to the first aspect, the intermetallic compound layer is preferably constituted by intermetallic compounds formed in a discontinuous manner along a rolling direction in a cross-sectional view. Accordingly, in the clad material for a battery current collector, a portion in which no intermetallic compound is formed, i.e., a portion in which the first layer and the second layer are in direct contact with each other, can be formed. Consequently, a decrease in electrical conductivity (an increase in electrical resistance) due to the intermetallic compounds interposed between the first layer and the second layer can be significantly reduced or prevented. Note that the term "discontinuous" refers to a state in which the intermetallic compound layer is divided in the rolling direction at a plurality of locations such that a plurality of intermetallic compounds spaced apart from each other in the rolling direction are arranged in the rolling direction. Furthermore, the "thickness of the intermetallic compound layer formed in a discontinuous manner" refers to an average value (average maximum thickness) calculated based on individual measurement values (maximum thicknesses) obtained by selecting at least the ten longest intermetallic compounds in the rolling direction among a plurality of divided intermetallic compounds in the range of a predetermined length in the rolling direction (a unit length in the rolling direction obtained using a microscope described below, for example), and measuring the maximum thicknesses of the selected individual intermetallic compounds in a cladding direction (the thickness direction of the clad material).

In the aforementioned clad material for a battery current collector according to the first aspect, in the cross-sectional view, a sum of lengths of the intermetallic compounds in the rolling direction within a unit length in the rolling direction is preferably 50% or less of the unit length. Note that the "unit length in the rolling direction" refers to a length of 300 µm along the rolling direction selected at random on an observation image (including a photograph) of a mirror-polished cross-section including a bonding interface of the clad material (test object) for a battery current collector, acquired using the microscope (VHX-5000 manufactured by Keyence Corporation; 1000× magnification). Accordingly, in the clad material for a battery current collector, the proportion of a portion in which the intermetallic compounds are formed is reduced such that the proportion of the portion in which the first layer and the second layer are in direct contact with each other can be increased. Thus, a decrease in electrical conductivity (an increase in electrical resistance) due to the intermetallic compounds interposed between the first layer and the second layer can be effectively significantly reduced or prevented.

In this case, in the cross-sectional view, the sum of the lengths of the intermetallic compounds in the rolling direction within the unit length is preferably 10% or more and 30% or less of the unit length. Accordingly, the sum of the lengths of the intermetallic compounds in the rolling direction is 10% or more of the unit length such that an excessive decrease in the proportion of the formed intermetallic compounds can be significantly reduced or prevented, and thus an excessive decrease in the bonding strength between the first layer and the second layer can be significantly reduced or prevented. Furthermore, the sum of the lengths of the intermetallic compounds in the rolling direction is 30% or less of the unit length such that an increase in electrical resistance due to the intermetallic compounds interposed between the first layer and the second layer can be more effectively significantly reduced or prevented.

In the aforementioned clad material for a battery current collector according to the first aspect, the thickness of the clad material is preferably 10 µm or more and 30 µm or less. Accordingly, the thickness of the clad material for a battery current collector can be further reduced. In addition, even when the thickness of the first layer made of Al or an Al alloy is further reduced by further reducing the thickness of the clad material to a thickness t1 of 10 µm or more and 30 µm or less, as described above, the thickness of the intermetallic compound layer is set to 1 µm or less such that formation of a pinhole due to falling off of the intermetallic compound caused by exposure of the hard intermetallic compound on the outer surface of the first layer can be significantly reduced or prevented.

In the aforementioned clad material for a battery current collector according to the first aspect, a thickness of the first layer is preferably equal to or smaller than a thickness of the second layer and larger than the thickness of the intermetallic compound layer. Accordingly, the thickness of the first layer is equal to or smaller than the thickness of the second layer such that an increase in the proportion of the first layer made of Al or an Al alloy, which is easily plastically deformed, can be significantly reduced or prevented. Thus, defects such as deformation and breakage that occur when the second layer cannot follow the rolling of the first layer during rolling can be reliably significantly reduced or prevented. Furthermore, the thickness of the first layer is larger than the thickness of the intermetallic compound layer such that falling off of the intermetallic compound caused by its exposure on the outer surface of the first layer can be reliably significantly reduced or prevented.

A method for manufacturing a clad material for a battery current collector according to a second aspect of the present invention includes bonding a first plate material made of Al or an Al alloy and a second plate material made of any one of Ni, a Ni alloy, Fe, and a Fe alloy by rolling in a state in which the first plate material made of the Al or the Al alloy and the second plate material made of any one of the Ni, the Ni alloy, the Fe, and the Fe alloy are stacked, and forming an intermetallic compound containing Al and Ni or an intermetallic compound containing Al and Fe between the first plate material and the second plate material by performing annealing under a temperature condition of 350° C. or more and 550° C. or less after the rolling, further performing rolling, and performing annealing under the temperature condition of 350° C. or more and 550° C. or less to produce the clad material including a first layer made of the Al or the Al alloy, a second layer made of any one of the Ni, the Ni alloy, the Fe, and the Fe alloy, and an intermetallic compound layer constituted by the intermetallic compound and having a thickness of 0.1 µm or more and 1 µm or less, the clad material having a thickness of 50 µm or less.

In the method for manufacturing a clad material for a battery current collector according to the second aspect of the present invention, as described above, annealing is performed under the temperature condition of 350° C. or more and 550° C. or less such that the thickness of the intermetallic compound layer constituted by the intermetallic compound can be controlled to 1 µm or less. Accordingly, even when using the second layer made of any one of Ni, a Ni alloy, Fe, and a Fe alloy and having appropriate mechanical strength, the clad material having a thickness of 50 µm or less is produced by further rolling after annealing, exposure of the hard intermetallic compound on the outer surface of the first layer made of Al or an Al alloy can be significantly reduced or prevented. Consequently, formation of a pinhole due to falling off of the intermetallic compound from the outer surface of the first layer can be significantly reduced or prevented, and thus exposure of the second layer made of any one of Ni, a Ni alloy, Fe, and a Fe alloy on the outer surface side of the first layer from a pinhole formed in the first layer in this manner can be significantly reduced or prevented.

Effect of the Invention

According to the present invention, as described above, it is possible to provide the clad material for a battery current collector and the method for manufacturing the clad material for a battery current collector in which formation of the pinhole due to falling off of the intermetallic compound containing Al and Ni and having appropriate mechanical strength or the intermetallic compound containing Al and Fe and having appropriate mechanical strength from the outer surface of the first layer can be significantly reduced or prevented even when the thickness of the clad material for a battery current collector is reduced to 50 µm or less.

MODES FOR CARRYING OUT THE INVENTION

An embodiment embodying the present invention is hereinafter described on the basis of the drawings.

The configuration of a clad material 1 for a battery current collector according to the embodiment of the present invention is now described with reference to FIGS. 1 and 2.

The clad material 1 for a battery current collector (hereinafter referred to as a clad material 1) shown in FIG. 1 according to the embodiment of the present invention is used as a current collector of a chargeable/dischargeable bipolar secondary battery 100 (hereinafter referred to as a battery 100) shown in FIG. 2. Specifically, as shown in FIGS. 1 and 2, in the clad material 1, a positive electrode active material layer 101 is formed on a surface on one side (Z1 side) in a thickness direction (Z direction), and a negative electrode active material layer 102 is formed on a surface on the other side (Z2 side). Thus, the clad material 1 is used as a bipolar electrode 103 (current collector) of the battery 100 in a state in which the positive electrode active material layer 101 and the negative electrode active material layer 102 are formed.

Figure 2:
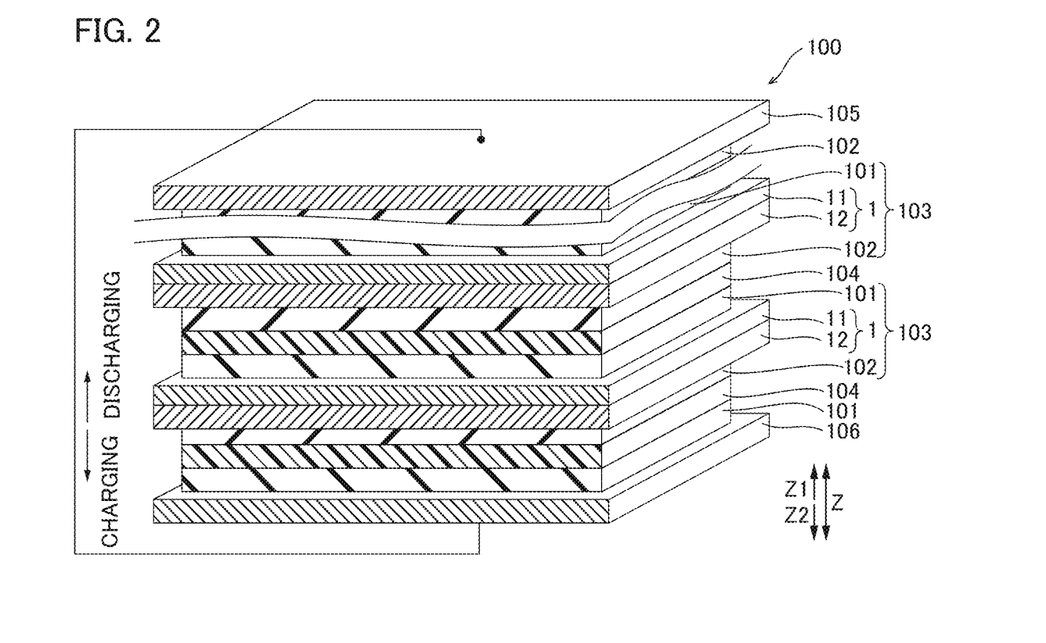
FIG. 2 A schematic view showing an example of the configuration of a bipolar secondary battery using the clad material for a battery current collector according to the embodiment of the present invention.

This bipolar electrode 103 is used as an intermediate electrode of the battery 100 as shown in FIG. 2. Specifically, in the battery 100, a plurality of bipolar electrodes 103 are stacked in the thickness direction via an electrolyte layer 104. At this time, the bipolar electrodes 103 are arranged such that poles different from each other face each other in the thickness direction via the electrolyte layer 104. Electricity (electric power) is taken out of the battery 100 via electrodes 105 and 106 arranged on the outermost layers at the time of discharging, and electricity (electric power) is taken in from the outside of the battery 100 via the electrodes 105 and 106 at the time of charging.

Figure 1:
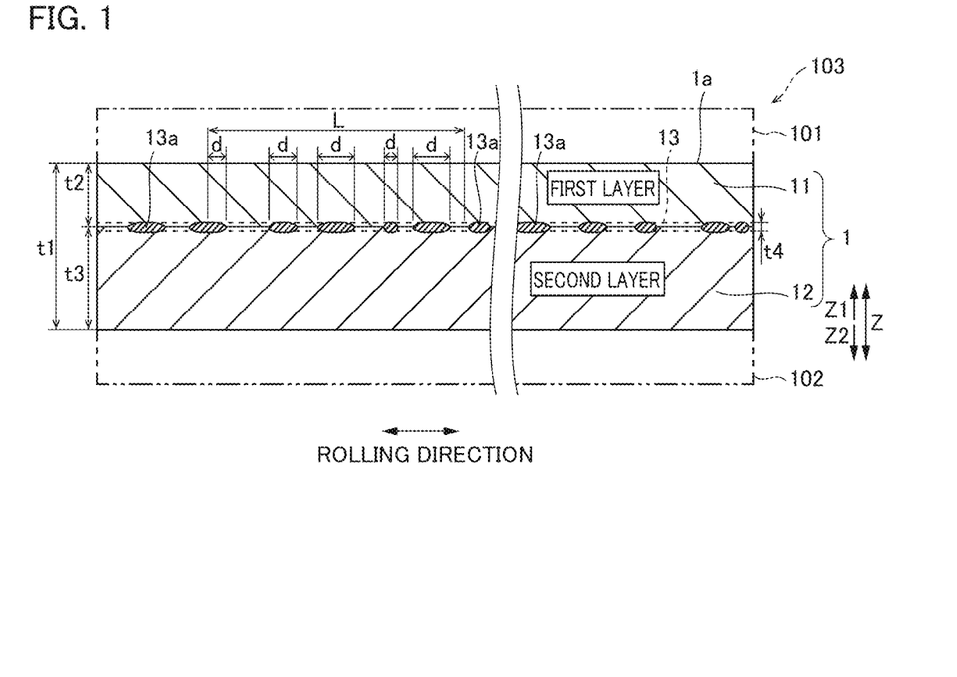
FIG. 1 A diagram showing an example of the cross-sectional configuration of a clad material for a battery current collector according to an embodiment of the present invention.

As shown in FIG. 1, the clad material 1 is a foil-shaped member having a length (thickness) t1 of 50 µm or less in a cladding direction (Z direction). The thickness t1 of the clad material 1 is preferably 30 µm or less in order to reduce the thickness of the bipolar electrode 103 and the thickness of the battery 100 using the same. Furthermore, the thickness t1 of the clad material 1 is preferably 10 µm or more and more preferably 20 µm or more in order to significantly reduce or prevent the difficulty in producing the clad material 1 and to significantly reduce or prevent breakage during handling of the clad material 1.

In the clad material 1, a first layer 11 made of Al or an Al alloy and a second layer 12 made of any one of Ni, a Ni alloy, Fe, and a Fe alloy are bonded to each other by rolling in a state in which the same are stacked in the cladding direction (Z direction). That is, the clad material 1 is a clad material having a two-layer structure including the first layer 11 and the second layer 12. The first layer 11 is arranged on one side (Z1 side, the positive electrode active material layer 101 side) in the thickness direction of the battery 100, and the second layer 12 is arranged on the other side (Z2 side, the negative electrode active material layer 102 side) in the thickness direction of the battery 100.

As the Al (pure aluminum) of which the first layer 11 is made, A1000 series (such as A1050, JIS standards) containing about 99 mass % or more of Al can be used. As the Al alloy of which the first layer 11 is made, an Al—Mn alloy such as A3003 (JIS standards), an Al—Mg alloy such as A5052 (JIS standards), an Al—Mg—Si alloy such as A6061 (JIS standards), etc. can be used.

As the Ni (pure nickel) of which the second layer 12 is made, NW2200 series (such as NW2200, JIS standards) containing about 99 mass % or more of Ni can be used. As the Ni alloy of which the second layer 12 is made, a Ni—Cu alloy etc. of NW4400 series (such as NW4400, JIS standards) can be used.

As the Fe (pure iron) of which the second layer 12 is made, in addition to electrolytic iron (C is 0.005 mass % or less and the total of other impurity elements is 0.02 mass % or less) and armco iron (C is 0.01 mass % or less and the total of other impurity elements is 0.03 mass % or less), for example, which contain almost no C (carbon) and other impurity elements (Si (silicon), Mn (manganese), P (phosphorus), S (sulfur), etc.), a cold-rolled steel sheet, a cold-rolled steel strip (such as SPCC, SPCD, and SPCE), etc. of the JIS-standards can be used. As the Fe alloy of which the second layer 12 is made, a Fe—Cr alloy of ferritic stainless steel (such as SUS430 of the JIS-standards), a Fe—Ni—Cr alloy of austenitic stainless steel (such as SUS301, SUS304, and SUS316L of the JIS-standards), etc. can be used.

The Ni, Ni alloy, Fe, or Fe alloy of which the second layer 12 is made generally has higher mechanical strength than Cu, and thus the mechanical strength of the clad material 1 can be improved as compared with a case in which the second layer 12 is made of Cu, for example.

The thickness t2 of the first layer 11 is equal to or smaller than the thickness t3 of the second layer 12. Note that the thickness t2 of the first layer 11 is preferably 30% or less of the thickness t1 of the clad material 1 obtained by adding the thickness t2 of the first layer 11 and the thickness t3 of the second layer 12.

In the clad material 1, an intermetallic compound layer 13 constituted by intermetallic compounds containing Al and Ni or intermetallic compounds containing Al and Fe (simply referred to as intermetallic compounds 13a) is formed between (interface) the first layer 11 and the second layer 12. These intermetallic compounds 13a are obtained by bonding a portion of the first layer 11 and a portion of the second layer 12 to each other by heat during annealing and alloying the same. Compounds as the intermetallic compounds 13a may be Al—Ni alloys (such as $Al_3Ni$ or $Al_3Ni_2$) when the second layer 12 is made of Ni or a Ni alloy, and may be Al—Fe alloys (such as $Al_3Fe$, $Al_5Fe_2$, $Al_2Fe$, AlFe, or $AlFe_3$) when the second layer 12 is made of Fe or a Fe alloy. The intermetallic compound layer 13 constituted by these intermetallic compounds 13a has a function of increasing the bonding strength between the first layer 11 and the second layer 12. The Al—Ni alloys or Al—Fe alloys of which the intermetallic compounds 13a are made have sufficiently higher hardness, are less likely to plastically deform, and are more fragile than the Al or Al alloy of which the first layer 11 is made and the Ni, Ni alloy, Fe, or Fe alloy of which the second layer 12 is made.

In the clad material 1 according to the present embodiment, the length (thickness) t4 of the intermetallic compound layer 13 in the cladding direction (Z direction) is 0.1 μm or more and 1 μm or less, and is much smaller than any of the thickness t1 of the clad material 1, the thickness t2 of the first layer 11, and the thickness t3 of the second layer 12. The thickness t4 of the intermetallic compound layer 13 is preferably 0.4 μm or less. Thus, the thickness of the intermetallic compound layer 13 is 1 μm or less, which is sufficiently small, such that exposure of the intermetallic compounds 13a on the outer surface 1a on the first layer 11 side caused by penetration of the intermetallic compounds 13a through the first layer 11 having low mechanical strength is significantly reduced or prevented.

In the present embodiment, as shown in FIG. 1, in the clad material 1, the intermetallic compound layer 13 is constituted by the intermetallic compounds 13a formed in a discontinuous manner along a rolling direction in a cross-sectional view. That is, in the intermetallic compound layer 13, a plurality of intermetallic compounds 13a spaced apart from each other in the rolling direction are arranged along the rolling direction. In the intermetallic compound layer 13, the sum of the lengths d of the individual intermetallic compounds 13a in the rolling direction, which can be confirmed within a unit length L in the rolling direction, is preferably 50% or less of the unit length L. That is, the first layer 11 and the second layer 12 are preferably in direct contact with each other within the unit length L in a range exceeding 50%. Thus, a decrease in the electrical conductivity of the clad material 1 due to excessive formation of the intermetallic compounds 13a having a higher electrical resistance than the first layer 11 and the second layer 12 can be significantly reduced or prevented. Note that in the intermetallic compound layer 13, the sum of the lengths d of the individual intermetallic compounds 13a in the rolling direction, which can be confirmed within the unit length L, is more preferably 30% or less of the unit length L. On the other hand, in order to significantly reduce or prevent an excessive decrease in the bonding strength between the first layer 11 and the second layer 12, in the intermetallic compound layer 13, the sum of the lengths d of the individual intermetallic compounds 13a in the rolling direction, which can be confirmed within the unit length L, is preferably 10% or more.

In the intermetallic compound layer 13, there are two interfaces, which are an interface between the first layer 11 and an intermetallic compound 13a and an interface between the second layer 12 and the intermetallic compound 13a, at a location at which the intermetallic compound 13a is formed. On the other hand, there is one interface, which is an interface between the first layer 11 and the second layer 12, at a location at which the first layer 11 and the second layer 12 are in direct contact with each other (location at which no intermetallic compound 13a is formed). Consequently, the location at which the intermetallic compound 13a is formed has lower electrical conductivity than the location at which the first layer 11 and the second layer 12 are in direct contact with each other due to a larger number of interfaces.

Figure 3:
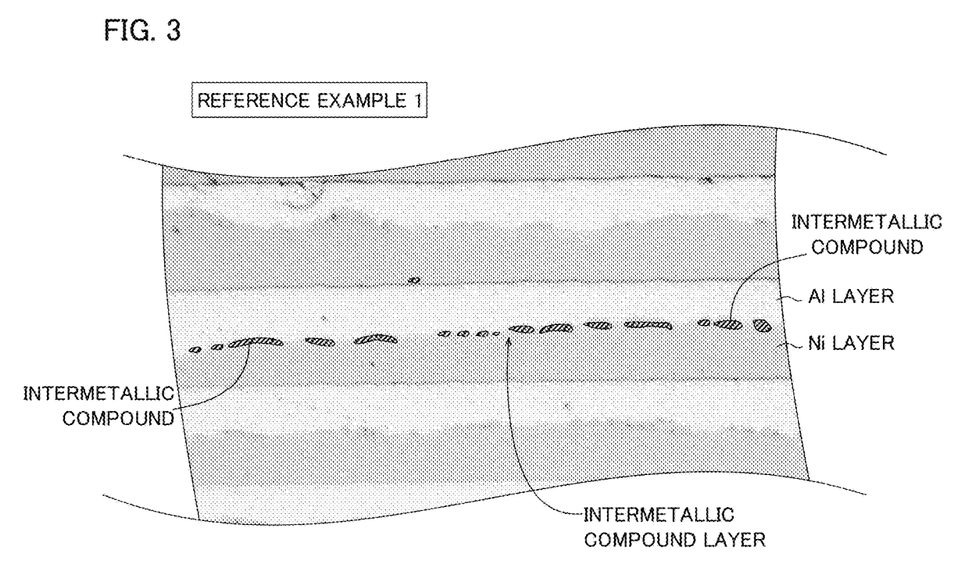
FIG. 3 A diagram (photograph) of a clad material, in which intermetallic compounds are formed in a discontinuous manner, shown in a cross-sectional view as Reference Example 1.

As reference examples, photographs of a clad material in which an intermetallic compound layer constituted by intermetallic compounds formed in a discontinuous manner can be easily confirmed are shown. FIG. 3 shows Reference Example 1, and is a photograph (cross-sectional view) of an example of a clad material including a first layer (Al layer) made of Al, a second layer (Ni layer) made of Ni, and an intermetallic compound layer having a thickness more than 1 μm. In the photograph of FIG. 3, the cross-sections of clad materials are observed in a state in which a plurality of clad materials (one clad material has a thickness of 25 μm) are stacked to facilitate observation of the cross-sections of the clad materials. Similarly to Reference Example 1, the clad material 1 according to the present embodiment includes the intermetallic compound layer 13 having a thickness of 0.1 μm or more and 1 μm or less and constituted by the intermetallic compounds 13a formed in a discontinuous manner.

Figure 4:
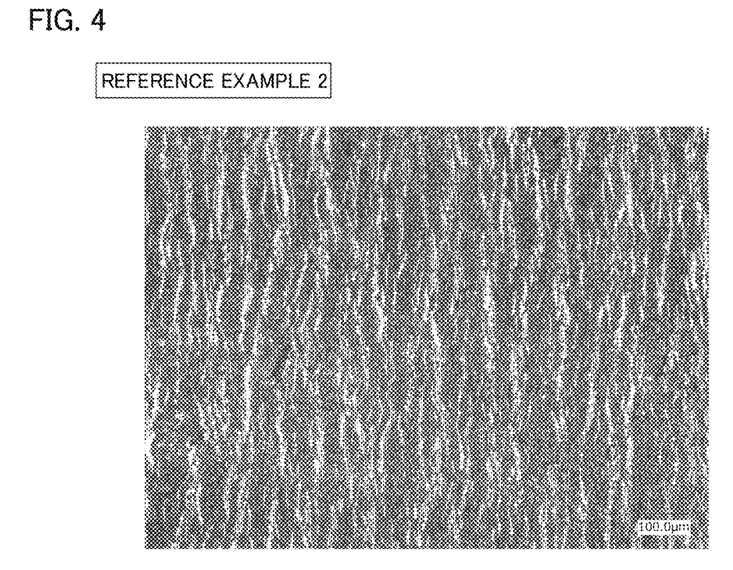
FIG. 4 A diagram (photograph) of a clad material, in which intermetallic compounds are formed in a discontinuous manner (net shape), shown in a plan view as Reference Example 2.

FIG. 4 shows Reference Example 2, and is a photograph (cross-sectional view) of an example of a clad material (the thickness of the clad material is 25 μm) including a first layer (Al layer) made of Al, a second layer (Ni layer) made of Ni, and an intermetallic compound layer constituted by intermetallic compounds formed in a discontinuous manner, similarly to Reference Example 1. In the photograph shown in FIG. 4, black portions (low brightness portions) are the intermetallic compounds, and white portions (high brightness portions) are the second layer (Ni layer). The intermetallic compound layer (intermetallic compounds) of the clad material can be observed by dipping a test object (clad material) into an aqueous solution of 20 mass % sodium hydroxide (for 10 minutes, for example), dissolving and removing the first layer (Al layer described above, for example) made of Al or an Al alloy, and exposing the bonding interface, for example. When the photograph shown in FIG. 4 is obtained, by the above method, the first layer (Al layer) is dissolved to expose the bonding interface at which the intermetallic compounds are located.

In Reference Example 2 shown in FIG. 4, the intermetallic compound layer has a discontinuous form (such a form is called a net shape) in which the intermetallic compounds are connected to each other like a mesh in a plan view such that no intermetallic compound is formed inside the mesh. In the case of a smaller amount of intermetallic compound, it is conceivable that the intermetallic compound layer has a separated form (such a form is called an island shape) in which the intermetallic compounds are not connected to each other like a mesh in a plan view. Furthermore, it is conceivable that the intermetallic compound layer constituted by the intermetallic compounds having a net shape form or an island shape form in a plan view, as described above, is constituted by the intermetallic compounds arranged in a discontinuous manner along the rolling direction in a cross-sectional view.

Similarly to Reference Example 1 shown in FIG. 3, the intermetallic compound layer 13 according to the present embodiment is constituted by the intermetallic compounds 13a not formed in a largely biased state but formed in a substantially evenly dispersed state in the rolling direction in a cross-sectional view. Furthermore, similarly to Reference Example 2 shown in FIG. 4, the intermetallic compound layer 13 according to the present embodiment is constituted by the intermetallic compounds 13a not formed in a largely biased state but formed in an island shape or a net shape in a plan view as viewed in the cladding direction (Z2 direction) in a state in which the first layer 11 is excluded, or in a plan view as viewed in the cladding direction (Z1 direction) in a state in which the second layer 12 is excluded.

The thickness t2 of the first layer 11 and the thickness t3 of the second layer 12 are larger than the thickness t4 of the intermetallic compound layer 13.

A manufacturing process of the clad material 1 according to the embodiment is now described with reference to FIGS. 1, 2, and 5.

Figure 5:
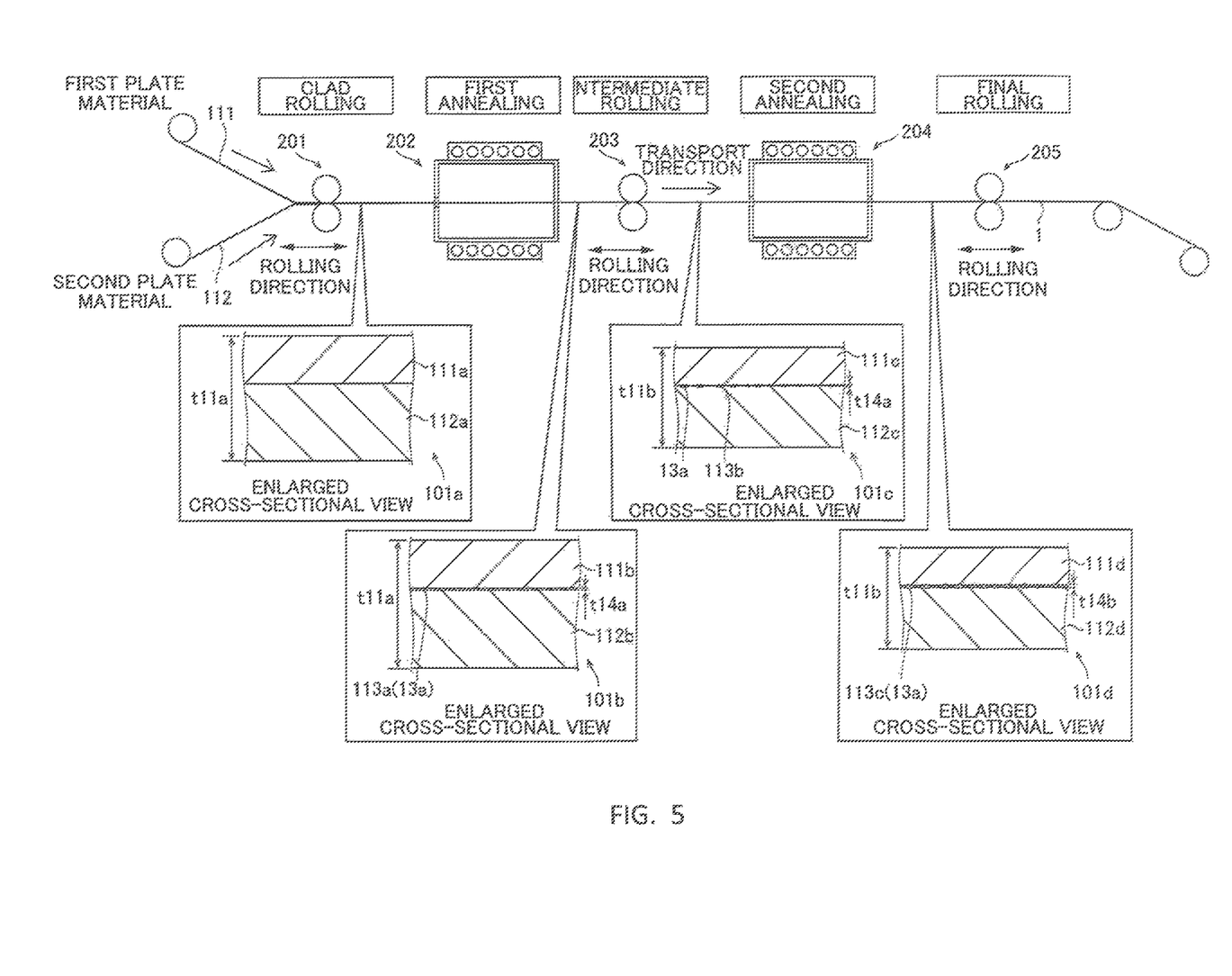
FIG. 5 A schematic view for illustrating a method for manufacturing the clad material for a battery current collector according to the embodiment of the present invention.

First, as shown in FIG. 5, a long first plate material 111 made of Al or an Al alloy, and a long second plate material 112 made of any one of Ni, a Ni alloy, Fe, and a Fe alloy are prepared. Both the first plate material 111 and the second plate material 112 are appropriately softened by annealing. The first plate material 111 is work-hardened to some extent such that the mechanical strength of the first plate material 111 can be closer to the mechanical strength of the second plate material 112. The thicknesses of the first plate material 111 and the second plate material 112 are adjusted such that the ratio of the thickness of the first plate material 111 and the thickness of the second plate material 112 is substantially equal to the ratio of the thickness t2 of the first layer 11 and the thickness t3 of the second layer 12 in the clad material 1, which is a final product (after final rolling described below). As an example, the thickness of the first plate material 111 is set to 0.4 mm, and the thickness of the second plate material 112 is set to 0.8 mm.

Then, in a state in which the long first plate material 111 and the second plate material 112 are stacked in a plate thickness direction (Z direction), rolling (clad rolling) is performed at a predetermined rolling reduction along a direction in which the first plate material 111 and the second plate material 112 extend. At this time, cold rolling can be performed at room temperature using a roller 201. Thus, a long bonded material 101a in which a first plate material 111a and a second plate material 112a are bonded to each other in a state in which the same are stacked in the plate thickness direction (cladding direction, Z direction) is produced. The rolling reduction at the time of clad rolling is preferably 50% or more in order to securely bond the first plate material 111a to the second plate material 112a. As an example, when the first plate material 111 having a thickness of 0.4 mm and the second plate material 112 having a thickness of 0.8 mm are clad-rolled at a rolling reduction of 50%, the thicknesses of the first plate material 111a and the second plate material 112a become 0.2 mm and 0.4 mm, respectively, and the thickness t11a of the bonded material 101a becomes 0.6 mm.

Thereafter, annealing (first annealing) is performed on the bonded material 101a under the temperature condition of 350° C. or more and 550° C. or less using an annealing furnace 202 such that a long clad material 101b having the same thickness as the bonded material 101a is produced. At this time, the annealing (first annealing) is preferably performed in a non-oxidizing atmosphere, and the annealing time is preferably several minutes (less than 10 minutes). When the second plate material 112a is made of Ni or a Ni alloy, the annealing temperature (350° C. or more and 550° C. or less) of the annealing (first annealing) according to the present embodiment is lower, and the annealing (first annealing) is performed in a shorter time (several minutes) as compared with normal Ni or Ni alloy annealing. When the second plate material 112a is made of Fe or a Fe alloy, the annealing temperature (350° C. or more and 550° C. or less) of the annealing (first annealing) according to the present embodiment is lower, and the annealing (first annealing) is performed in a shorter time (several minutes) as compared with normal Fe or Fe alloy annealing. Thus, in the second layer made of any one of Ni, a Ni alloy, Fe, and a Fe alloy having a higher recrystallization temperature than the first layer made of Al or an Al alloy, although no recrystallization occurs, recovery occurs, and rolling becomes easier to some extent. The first layer made of Al or an Al alloy having a lower recrystallization temperature is annealed to some extent.

During the annealing (first annealing) using the annealing furnace 202, the Al of the first plate material 111a and the Ni of the second plate material 112a react with each other, or the Al of the first plate material 111a and the Fe of the second plate material 112a react with each other such that in the clad material 101b, an intermetallic compound layer 113a constituted by an intermetallic compound containing Al and Ni or an intermetallic compound containing Al and Fe (intermetallic compound 13a) is formed between a first layer 111b using the first plate material 111a and a second layer 112b using the second plate material 112a. The intermetallic compound layer 113a is formed in a continuous manner after annealing (before intermediate rolling described below). The term "continuous" is different from "discontinuous", and indicates that the intermetallic compound layer is connected without being substantially divided in the rolling direction and extends in a layer along the rolling direction. After the annealing (before the intermediate rolling described below), the thickness t14a of the intermetallic compound layer 113a is less than 1 µm, and is smaller than the thickness t4 (see FIG. 1) of the intermetallic compound layer 13 in the clad material 1, which is a final product (after the final rolling described below).

Then, the clad material 101b is subjected to rolling (intermediate rolling) at a predetermined rolling reduction to produce a long clad material 101c. At this time, cold rolling can be performed at room temperature using a roller 203. By this intermediate rolling, the thickness t11b of the clad material 101c is made smaller than the thickness t11a of the clad material 101b. The intermetallic compound 13a that constitutes the intermetallic compound layer 113a is sufficiently harder, less likely to plastically deform, and more fragile than the Al or Al alloy of which the first layer 111b is made and the Ni, Ni alloy, Fe, or Fe alloy of which the second layer 112b is made. Thus, in the intermediate rolling, whereas the first layer 111b and the second layer 112b are preferentially extended in the rolling direction and have reduced thicknesses, the intermetallic compound layer 113a constituted by the hard intermetallic compounds 13a is hardly extended in the rolling direction, and the thickness t14a thereof hardly reduces. Consequently, the intermetallic compound 13a that constitutes the intermetallic compound layer 113a cannot follow the rolling due to its fragility, and is divided at a plurality of positions in the rolling direction. Thus, an intermetallic compound layer 113b in which individual intermetallic compounds 13a are dispersed in the rolling direction, i.e., the intermetallic compound layer 113b constituted by the intermetallic compounds 13a formed in a discontinuous manner is formed.

Given that the intermetallic compound 13a that constitutes the intermetallic compound layer 113a is hardly extended in the rolling direction, when the rolling reduction during the intermediate rolling is R1(%), in the intermetallic compound layer 113b, the sum of the lengths d of the intermetallic compounds 13a in the rolling direction within a unit length L (see FIG. 1) in the rolling direction conceivably becomes a value near (L×(100−R1)/100) in a cross-sectional view.

As an example, when the clad material 101b obtained by rolling (clad-rolling) the first plate material 111 having a thickness of 0.4 mm and the second plate material 112 having a thickness of 0.8 mm to have a thickness t11a of 0.6 mm is further subjected to the intermediate rolling at a rolling reduction R1 of 50%, the thickness of a first layer 111c and the thickness of a second layer 112c become 0.1 mm and 0.2 mm, respectively, and the thickness t11b of the clad material 101c becomes 0.3 mm. In this case, in the intermetallic compound layer 113b, the sum of the lengths d of the intermetallic compounds 13a in the rolling direction within the unit length L in the rolling direction conceivably becomes a value near 0.5L (50% of the unit length L) in a cross-sectional view.

Thereafter, annealing (second annealing) is performed on the clad material 101c under the temperature condition of 350° C. or more and 550° C. or less using an annealing furnace 204 such that a long clad material 101d is produced. Similarly to the annealing (first annealing) using the annealing furnace 202, the annealing (second annealing) using the annealing furnace 204 is preferably performed in a non-oxidizing atmosphere, and the annealing time is preferably several minutes (less than 10 minutes).

In this annealing (second annealing), similarly to the annealing (first annealing) using the annealing furnace 202, Al of the first layer 111c and Ni (or Fe) of the second layer 112c react with each other. Thus, in the clad material 101d, intermetallic compounds containing Al and Ni or intermetallic compounds containing Al and Fe (intermetallic compounds 13a) are formed at locations at which no intermetallic compounds 13a is formed during the previous annealing (first annealing) between (interface) a first layer 111d and a second layer 112d, and at locations at which the intermetallic compounds 13a are formed during the previous annealing (first annealing), the intermetallic compounds 13a further reacts with the adjacent first layer 111c or second layer 112c, and the intermetallic compounds 13a become slightly larger. Thus, the clad material 101d including an intermetallic compound layer 113c between the first layer 111d and the second layer 112d is produced. The intermetallic compounds 13a, which have been divided in a discontinuous manner by the intermediate rolling, are formed in a continuous manner by the annealing (second annealing) using the annealing furnace 204, and thus after the annealing using the annealing furnace 204 (before the final rolling described below), the intermetallic compound layer 113c is constituted by the intermetallic compounds 13a formed in a continuous manner. The thickness t14b of the intermetallic compound layer 113c is 0.1 µm or more and 1.0 µm or less.

Then, the clad material 101d is subjected to rolling (final rolling) at a predetermined rolling reduction such that the long clad material 1 (see FIG. 1) as a final product is produced. At this time, cold rolling can be performed at room temperature using a roller 205. By this final rolling, the thickness t1 of the clad material 1 is made smaller than the thickness t11b of the clad material 101d. In the final rolling, similarly to the intermediate rolling, whereas the first layer 111d and the second layer 112d are preferentially extended in the rolling direction and have reduced thicknesses, the hard intermetallic compound layer 113c is hardly extended in the rolling direction, and the thickness t14b thereof hardly reduces. Consequently, the intermetallic compound layer 113c constituted by the intermetallic compounds 13a cannot follow the rolling due to its fragility, and is divided at a plurality of positions in the rolling direction. Thus, the intermetallic compound layer 13 in which individual intermetallic compounds 13a are dispersed in the rolling direction, i.e., the intermetallic compound layer 13 constituted by the intermetallic compounds 13a formed in a discontinuous manner is formed.

At this time, the thickness t14b of the intermetallic compound layer 113c is 0.1 µm or more and 1.0 µm or less, which is sufficiently small, and thus even when the thickness of the first layer 111d is reduced to the thickness t2 (see FIG. 1) of the first layer 11, exposure of the hard intermetallic compounds 13a on the outer surface of the first layer 111d (the outer surface 1a of the first layer 11) is significantly reduced or prevented. Consequently, formation of a pinhole on the outer surface 1a of the first layer 11 due to falling off of the intermetallic compounds 13a caused by the exposure of the hard intermetallic compounds 13a on the outer surface 1a of the first layer 11 is significantly reduced or prevented, and thus exposure of the second layer 12 on the outer surface 1a side of the first layer 11 is significantly reduced or prevented.

Assuming that the rolling reduction at the time of final rolling is R2(%), similarly to the intermediate rolling, in the intermetallic compound layer 13, the sum of the lengths d of the intermetallic compounds 13a in the rolling direction within the unit length L (see FIG. 1) in the rolling direction conceivably becomes a value near (L×(100−R2)/100) in a cross-sectional view.

As an example, when the clad material 101d obtained by rolling (clad-rolling) the first plate material 111 having a thickness of 0.4 mm and the second plate material 112 having a thickness of 0.8 mm, as described above, to have a thickness t11b of 0.3 mm is further subjected to the final rolling at a rolling reduction of about 80% (83.3%), the thickness t2 of the first layer 11 and the thickness t3 of the second layer 12 become 0.015 mm (i.e., 15 μm) and 0.035 mm (i.e., 35 μm), respectively, and the thickness t1 of the clad material 1 becomes 0.050 mm (i.e., 50 μm). Furthermore, in the intermetallic compound layer 13, the sum of the lengths d of the intermetallic compounds 13a in the rolling direction within the unit length L in the rolling direction conceivably becomes a value near 0.2L (20% of the unit length L). That is, the intermetallic compound layer 13 is constituted by the intermetallic compounds 13a formed in a discontinuous manner such that the sum of the lengths d of the intermetallic compounds 13a in the rolling direction within the unit length L becomes 50% or less of the unit length L and 10% or more and 30% or less (approximately 20%) of the unit length L in a cross-sectional view. Therefore, in the clad material 1 as a final product, the above proportion (degree of discontinuity) with respect to the unit length L of the intermetallic compound layer 13 is substantially equal to 100−R2(%), where the rolling reduction at the time of the final rolling is R2(%).

In the present embodiment, as shown in FIG. 5, the clad rolling, the annealing (first annealing), the intermediate rolling, the annealing (second annealing), and the final rolling are continuously performed while the clad material is transported in a transport direction. Thus, the long clad material 1 is continuously produced.

Thereafter, as shown in FIG. 1, the positive electrode active material layer 101 and the negative electrode active material layer 102 are arranged on surfaces of the clad material 1 such that the bipolar electrode 103 is produced. At this time, exposure of the second layer 12 on the outer surface 1a side of the first layer 11 is significantly reduced or prevented, and thus direct contact of the exposed second layer 12 with both the positive electrode active material layer 101 and the negative electrode active material layer 102 is significantly reduced or prevented. The produced bipolar electrode 103 is used for the battery 100, as shown in FIG. 2.

In the present embodiment, the following advantageous effects are achieved.

In the present embodiment, as described above, the thickness of the intermetallic compound layer 13 constituted by the intermetallic compounds 13a is set to 1 μm or less. Accordingly, even when the thickness of the clad material 1 is reduced to 50 μm or less such that the thickness of the first layer 11 made of Al or an Al alloy is reduced, the thickness t4 of the intermetallic compound layer 13 is 1 μm or less, which is sufficiently small, and thus exposure of the hard intermetallic compounds 13a on the outer surface 1a of the first layer 11 can be significantly reduced or prevented. Consequently, in the clad material 1 using the second layer 12 made of any one of Ni, a Ni alloy, Fe, and a Fe alloy having appropriate mechanical strength, even when the thickness t1 is reduced to 50 μm or less, formation of a pinhole on the outer surface 1a of the first layer 11 due to falling off of the intermetallic compounds 13a caused by the exposure of the intermetallic compounds 13a on the outer surface 1a of the first layer 11 can be significantly reduced or prevented. Therefore, exposure of the second layer 12 made of Ni, a Ni alloy, Fe, or a Fe alloy on the outer surface 1a of the first layer 11 due to such a pinhole can be significantly reduced or prevented, and thus when the appropriate positive electrode active material layer 101 and the appropriate negative electrode active material layer 102 are arranged on both outer surfaces such that the clad material 1 is used for the electrode (bipolar electrode 103) of the battery 100, direct contact of the exposed second layer 12 with both the positive electrode active material layer 101 and the negative electrode active material layer 102 can be significantly reduced or prevented. Consequently, dissolution of Ni, a Ni alloy, Fe, or a Fe alloy of which the second layer 12 is made, which may occur during charging and discharging of the battery 100, can be prevented.

In the present embodiment, the thickness of the intermetallic compound layer 13 constituted by the intermetallic compounds 13a is set to 0.1 μm or more such that an excessive decrease in the bonding strength between the first layer 11 and the second layer 12 due to an insufficient amount of formed intermetallic compound layer 13 can be significantly reduced or prevented.

In the present embodiment, the intermetallic compound layer 13 is constituted by the intermetallic compounds 13a formed in a discontinuous manner along the rolling direction in a cross-sectional view. Accordingly, in the clad material 1, a portion in which no intermetallic compound 13a is formed, i.e., a portion in which the first layer 11 and the second layer 12 are in direct contact with each other, can be formed. Consequently, a decrease in electrical conductivity (an increase in electrical resistance) due to the intermetallic compounds 13a interposed between the first layer 11 and the second layer 12 can be significantly reduced or prevented. Furthermore, the intermetallic compound layer 13 is constituted by the intermetallic compounds 13a formed in a discontinuous manner such that even when the intermetallic compounds 13a easily fall off due to their exposure on the outer surface 1a of the first layer 11, the thickness t4 of the intermetallic compound layer 13 is 1 μm or less, which is sufficiently small, and thus the exposure of the intermetallic compounds 13a on the outer surface 1a of the first layer 11 itself can be significantly reduced or prevented. Accordingly, falling off of the intermetallic compounds 13a caused by the exposure of the intermetallic compounds 13a on the outer surface 1a of the first layer 11 can be reliably significantly reduced or prevented.

In the present embodiment, preferably, the intermetallic compound layer 13 is constituted by the intermetallic compounds 13a formed in a discontinuous manner such that the sum of the lengths d of the intermetallic compounds 13a in the rolling direction within the unit length L in the rolling direction is 50% or less of the unit length L in a cross-sectional view. Accordingly, in the clad material 1, the proportion of the portion in which the intermetallic compounds 13a are formed is reduced such that the proportion of the portion in which the first layer 11 and the second layer 12 are in direct contact with each other can be increased. Thus, a decrease in electrical conductivity (an increase in electrical resistance) due to the intermetallic compounds 13a interposed between the first layer 11 and the second layer 12 can be effectively significantly reduced or prevented.

In the present embodiment, preferably, the intermetallic compound layer 13 is constituted by the intermetallic compounds 13a formed such that the sum of the lengths d of the intermetallic compounds 13a in the rolling direction within the unit length L in the rolling direction is 10% or more of the unit length L in a cross-sectional view. Accordingly, an excessive decrease in the proportion of the formed intermetallic compounds 13a can be significantly reduced or prevented, and thus an excessive decrease in the bonding strength between the first layer 11 and the second layer 12 can be significantly reduced or prevented.

In the present embodiment, the thickness t1 of the clad material 1 is set to 10 μm or more and 30 μm or less such that the thickness of the clad material 1 can be further reduced. In addition, even when the thickness t2 of the first layer 11 is further reduced (15 μm, for example) by further reducing the thickness t1 of the clad material 1 to 10 μm or more and 30 μm or less, the thickness of the intermetallic compound layer 13 is set to 1 μm or less such that formation of a pinhole in the outer surface 1a of the first layer 11 due to falling off of the intermetallic compounds 13a caused by exposure of the hard intermetallic compounds 13a on the outer surface 1a of the first layer 11 can be significantly reduced or prevented.

In the present embodiment, the thickness t2 of the first layer 11 is equal to or smaller than the thickness t3 of the second layer 12 such that an increase in the proportion of the first layer 11 made of Al or an Al alloy, which is easily plastically deformed, can be significantly reduced or prevented. Thus, the occurrence of a state in which the second layer 12 cannot follow the rolling of the first layer 11 during rolling can be reliably significantly reduced or prevented.

In the present embodiment, the thickness t2 of the first layer 11 is larger than the thickness t4 of the intermetallic compound layer 13 such that falling off of the intermetallic compounds 13a caused by their exposure on the outer surface 1a of the first layer 11 can be reliably significantly reduced or prevented.

In the manufacturing method according to the present embodiment, annealing (the first annealing and the second annealing described above) is performed under the temperature condition of 350° C. or more and 550° C. or less such that the thickness of the intermetallic compound layer 13 constituted by the intermetallic compounds 13a can be controlled to 1 μm or less.

EXAMPLES

An examination performed to confirm the effect of the present invention is now described with reference to FIGS. 6, 7, 8, and 9.

Example 1

In Example 1, a clad material was produced using an Al plate having a thickness of 0.3 mm as a first plate material 111 and a Ni plate having a thickness of 0.6 mm as a second plate material 112.

First, in a state in which the first plate material 111 and the second plate material 112 were stacked in a plate thickness direction (Z direction), clad rolling was performed along a direction in which the first plate material 111 and the second plate material 112 extended at a rolling reduction of about 61% at room temperature, and a bonded material 101a was produced. The overall thickness of the produced bonded material 101a was 0.35 mm.

After the clad rolling, annealing (first annealing) was performed on the bonded material 101a at 450° C. for 3 minutes in a non-oxidizing atmosphere using an annealing furnace 202 to produce a clad material 101b.

After the annealing (first annealing), intermediate rolling was further performed on the clad material 101b at room temperature at a rolling reduction of about 86% to produce a clad material 101c. By this intermediate rolling, the overall thickness of the clad material 101c became 50 μm.

After the intermediate rolling, annealing (second annealing) was performed on the clad material 101c at 450° C. for 3 minutes using an annealing furnace 204 to produce a clad material 101d.

After the annealing (second annealing), final rolling was performed on the clad material 101d at a rolling reduction of 54% to produce a clad material 1. The ratio of the thickness of a first layer (Al layer) to the thickness of a second layer (Ni layer) of the produced clad material 1 was 1:2, and the overall thickness was 23 μm.

Figure 6:
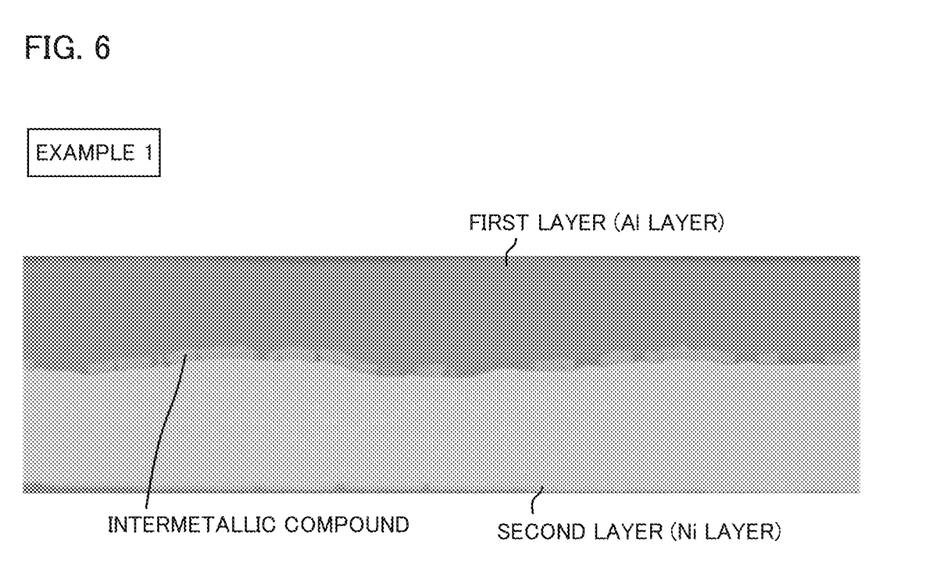
FIG. 6 A photograph showing the cross-section of Example 1 of the present invention.

FIG. 6 is a photograph (cross-sectional view) of a clad material of Example 1. The thicknesses of the Al layer and the Ni layer of the completed clad material of Example 1 were measured at five locations, respectively, and the average values were obtained. TABLE 1 shows the results.

TABLE 1

| THICKNESS MEASUREMENT DATA (μm) | 1 | 2 | 3 | 4 | 5 | AVERAGE n = 5 |
|---|---|---|---|---|---|---|
| FIRST LAYER (Al LAYER) | 10.6 | 10.9 | 7.2 | 6.3 | 6.8 | 8.4 |
| SECOND LAYER (Ni LAYER) | 12.0 | 12.5 | 15.8 | 16.2 | 15.9 | 14.5 |

As shown in TABLE 1, the thicknesses of the first layer (Al layer) measured at the five locations were 10.6 μm, 10.9 μm, 7.2 μm, 6.3 μm, and 6.8 μm, respectively, in the range of 6 μm to 11 μm. The average of the thicknesses of the first layer (Al layer) at the five locations was 8.4 μm.

The thicknesses of the second layer (Ni layer) measured at the five locations were 12.0 μm, 12.5 μm, 15.8 μm, 16.2 μm, and 15.9 μm, respectively, in the range of 12.0 μm to 16.5 μm. The average of the thicknesses of the second layer (Ni layer) at the five locations was 14.5 μm.

In Example 1, as shown in FIG. 6, an intermetallic compound layer was divided into a plurality of portions in a rolling direction. The size (thickness) of each of intermetallic compounds that constituted the intermetallic compound layer in the thickness direction of the clad material was about 0.6 μm or more and 0.7 μm or less (less than 1 μm), and thus the thickness of the intermetallic compound layer was about 0.7 μm (less than 1 μm). Furthermore, the length of each of the intermetallic compounds in the rolling (longitudinal) direction was 15 μm or less.

Comparative Example 1

In Comparative Example 1, a clad material was produced using the same materials and the same method as in Example 1 except that the second annealing temperature was changed to 580° C.

Figure 7:
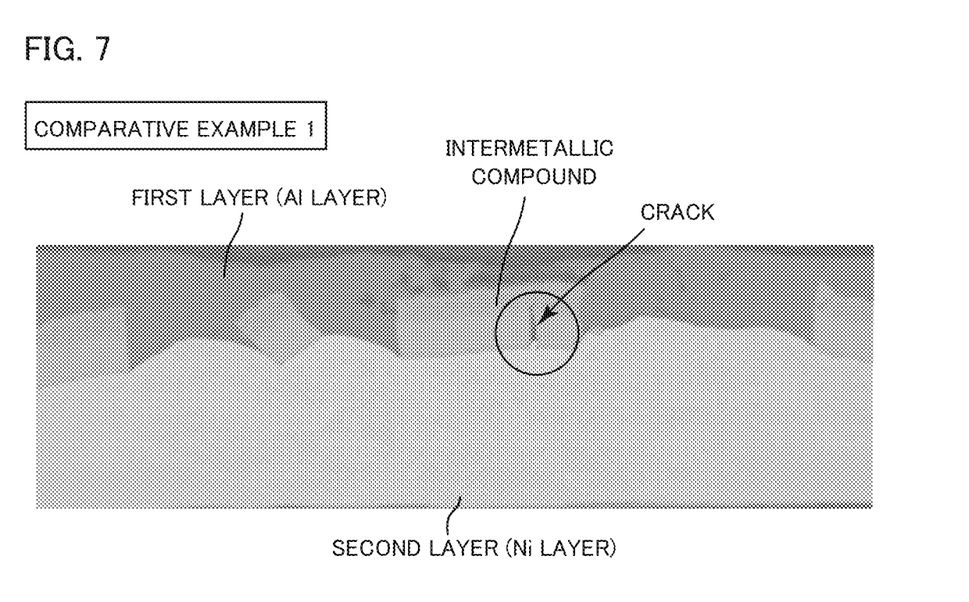
FIG. 7 A photograph showing the cross-section of Comparative Example 1.

FIG. 7 is a photograph (cross-sectional view) of the clad material 1 of Comparative Example 1. The thicknesses of a first layer (Al layer) and a second layer (Ni layer) of the completed clad material of Comparative Example 1 were measured at five locations, respectively, and the average values were obtained. TABLE 2 shows the results.

TABLE 2

| THICKNESS MEASUREMENT DATA (μm) | 1 | 2 | 3 | 4 | 5 | AVERAGE n = 5 |
|---|---|---|---|---|---|---|
| FIRST LAYER (Al LAYER) | 8.7 | 7.7 | 6.3 | 11.9 | 8.9 | 8.7 |
| SECOND LAYER (Ni LAYER) | 14.5 | 14.9 | 16.8 | 13.3 | 14.9 | 14.9 |

As shown in TABLE 2, the thicknesses of the first layer (Al layer) measured at the five locations were 8.7 μm, 7.7 μm, 6.3 μm, 11.9 μm, and 8.9 μm, respectively, in the range of 6 μm to 12 μm. The average of the thicknesses of the first layer (Al layer) at the five locations was 8.7 μm.

The thicknesses of the second layer (Ni layer) measured at the five locations were 14.5 μm, 14.9 μm, 16.8 μm, 13.3 μm, and 14.9 μm, respectively, in the range of 13 μm to 17 μm. The average of the thicknesses of the second layer (Ni layer) at the five locations was 14.9 μm.

In Comparative Example 1, as shown in FIG. 7, an intermetallic compound layer was divided into a plurality of portions in a rolling (longitudinal) direction. The size (thickness) of each of intermetallic compounds that constituted the intermetallic compound layer in the thickness direction of the clad material was about 6 μm, and thus the thickness of the intermetallic compound layer was about 6 μm. Furthermore, in Comparative Example 1, as shown in FIG. 7, a crack occurred in the intermetallic compounds.

The intermetallic compounds (Al—Ni alloy, for example) that constitute the intermetallic compound layers formed in Example 1 and Comparative Example 1 are sufficiently harder than the Al of which the first layers are made and the Ni of which the second layers are made. Therefore, even if rolling had been performed, the thicknesses of the intermetallic compound layers would not have been reduced. On the other hand, the intermetallic compounds are fragile, and thus it is believed that the intermetallic compound layers could not follow the rolling, and were divided and formed in a discontinuous manner.

The thicknesses of the intermetallic compound layers are unlikely to be reduced by the rolling, and thus it is believed that the thicknesses of the intermetallic compound layers of the completed clad materials are determined by the first annealing or the second annealing. In other words, it is believed that the thicknesses of the intermetallic compound layers of the completed clad materials are determined by how much the intermetallic compounds grow by the annealing.

Therefore, it is believed that in Example 1 in which the second annealing temperature was lower than that of Comparative Example 1, the growth of the intermetallic compounds was significantly reduced or prevented due to the lower second annealing temperature, and thus the thickness of the intermetallic compound layer became less than 1 μm. On the other hand, in Comparative Example 1, it is believed that the intermetallic compounds grew by the second annealing, and thus the thickness of the intermetallic compound layer became more than 1 μm. From this, the inventor has found that the thickness of the intermetallic compound layer can be reduced to 1 μm or less by setting the second annealing temperature to less than 580° C. (550° C. or less, for example) even when the second annealing is performed after the first annealing.

Example 2

In Example 2, an Al plate having a thickness of 0.3 mm was prepared as a first plate material 111, a Fe plate having a thickness of 0.6 mm was prepared as a second plate material 112, and a clad material was produced.

First, in a state in which the prepared first plate material 111 and second plate material 112 were stacked in a plate thickness direction (Z direction), clad rolling was performed at a rolling reduction of 72.2% at room temperature along a direction in which the first plate material 111 and the second plate material 112 extended, and a bonded material 101a was produced. The overall thickness of the produced bonded material 101a was 0.25 mm.

After the clad rolling, annealing (first annealing) was performed on the bonded material 101a at 350° C. for 3 minutes in a non-oxidizing atmosphere using an annealing furnace 202 to produce a clad material 101b.

After the annealing (first annealing), intermediate rolling was performed on the clad material 101b at room temperature at a rolling reduction of 80% to produce a clad material 101c. By this intermediate rolling, the overall thickness of the clad material 101c became 50 μm.

After the intermediate rolling, annealing (second annealing) was performed on the clad material 101c at 350° C. for 3 minutes using an annealing furnace 204.

After the annealing (second annealing), final rolling was performed on a clad material 101d at a rolling reduction of 50% to produce a clad material having an overall thickness of 25 μm.

Figure 8:
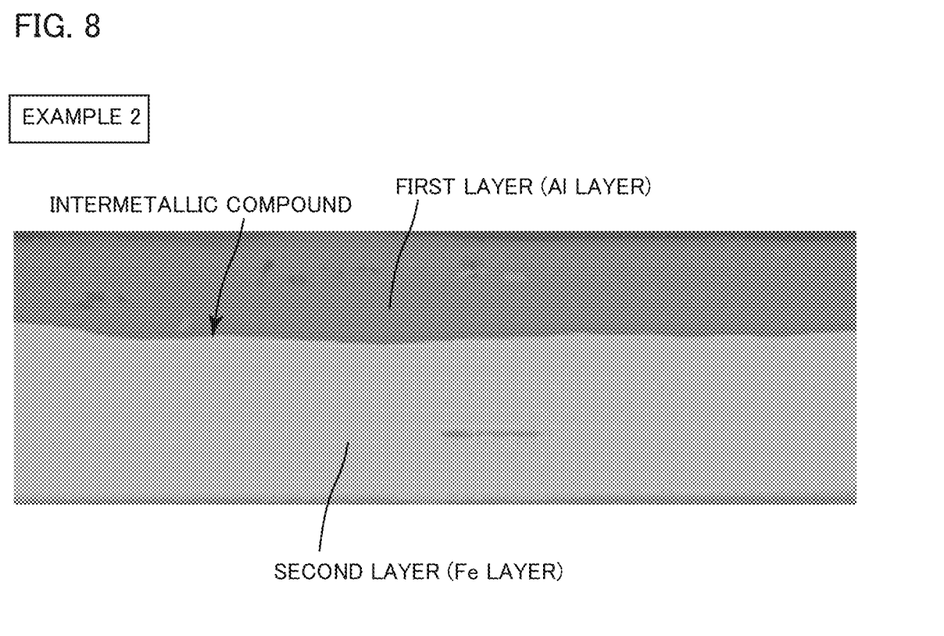
FIG. 8 A photograph showing the cross-section of Example 2 of the present invention.

FIG. 8 is a photograph (cross-sectional view) of the clad material of Example 2. The thicknesses of a first layer (Al layer) and a second layer (Fe layer) of the completed clad material were measured at five locations, respectively, and the average values were obtained. TABLE 3 shows the results.

TABLE 3

| THICKNESS MEASUREMENT DATA (μm) | 1 | 2 | 3 | 4 | 5 | AVERAGE n = 5 |
|---|---|---|---|---|---|---|
| FIRST LAYER (Al LAYER) | 8.1 | 8.3 | 8.6 | 6.0 | 9.0 | 8.0 |
| SECOND LAYER (Fe LAYER) | 17.3 | 16.6 | 16.4 | 16.9 | 16.4 | 16.7 |

As shown in TABLE 3, the thicknesses of the first layer (Al layer) measured at the five locations were 8.1 μm, 8.3 μm, 8.6 μm, 6.0 μm, and 9.0 μm, respectively, in the range of 6 μm to 9 μm. The average of the thicknesses of the first layer (Al layer) at the five locations was 8.0 μm.

The thicknesses of the second layer (Fe layer) measured at the five locations were 17.3 μm, 16.6 μm, 16.4 μm, 16.9 μm, and 16.4 μm, respectively, in the range of 16 μm to 17.5 μm. The average of the thicknesses of the second layer (Fe layer) at the five locations was 16.7 μm.

In EXAMPLE 2, as shown in FIG. 8, an intermetallic compound layer was formed in a continuous manner in a rolling (longitudinal) direction, and no break was observed.

The thickness of the intermetallic compound layer constituted by an intermetallic compound was about 0.3 μm (less than 1 μm).

Comparative Example 2

In Comparative Example 2, a clad material was produced using the same materials and the same method as in Example 2 except that the second annealing temperature and time were changed to 580° C. and 1 minute.

Figure 9:
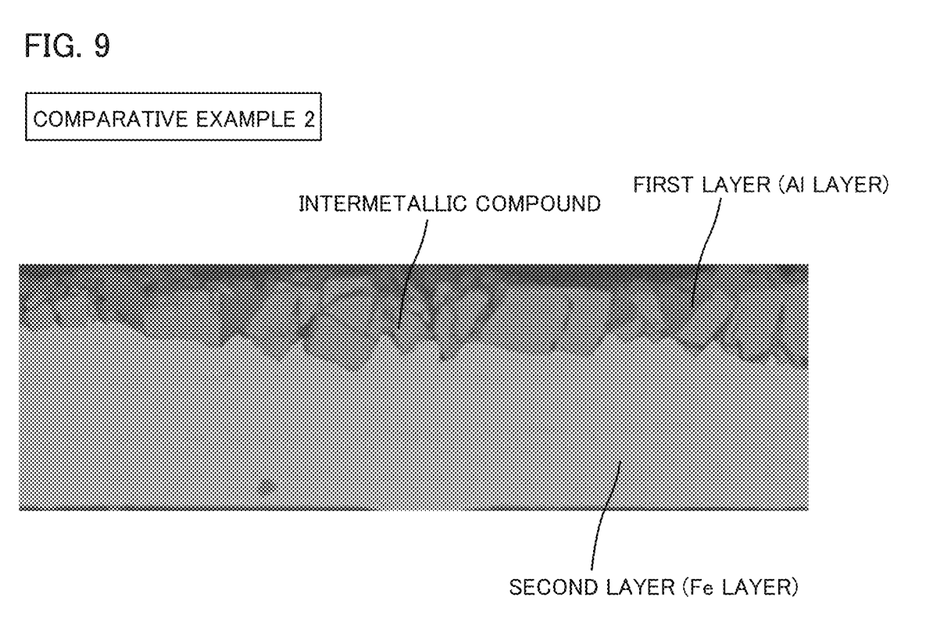
FIG. 9 A photograph showing the cross-section of Comparative Example 2.

FIG. 9 is a photograph (cross-sectional view) of the clad material of Comparative Example 2. The thicknesses of a first layer (Al layer) and a second layer (Fe layer) of the completed clad material were measured at five locations, respectively, and the average values were obtained. TABLE 4 shows the results.

TABLE 4

| THICKNESS MEASUREMENT DATA (μm) | 1 | 2 | 3 | 4 | 5 | AVERAGE n = 5 |
|---|---|---|---|---|---|---|
| FIRST LAYER (Al LAYER) | 6.0 | 6.6 | 7.9 | 7.6 | 6.6 | 6.9 |
| SECOND LAYER (Fe LAYER) | 19.3 | 18.0 | 18.3 | 16.4 | 18.0 | 18.0 |

As shown in TABLE 4, the thicknesses of the first layer (Al layer) measured at the five locations were 6.0 μm, 6.6 μm, 7.9 μm, 7.6 μm, and 6.6 μm, respectively, in the range of 6 μm to 8 μm. The average of the thicknesses of the first layer (Al layer) at the five locations was 6.9 μm. This indicates that the thickness became smaller than that of the first layer (Al layer) of Example 2.

The thicknesses of the second layer (Fe layer) measured at the five locations were 19.3 μm, 18.0 μm, 18.3 μm, 16.4 μm, and 18.0 μm, respectively, in the range of 16 μm to 19.5 μm. The average of the thicknesses of the second layer (Fe layer) at the five locations was 18.0 μm.

In Comparative Example 2, as shown in FIG. 9, an intermetallic compound layer is divided into a plurality of portions in a rolling (longitudinal) direction, and intermetallic compounds partially penetrated the first layer (Al layer) and were partially exposed. The size (thickness) of each of the intermetallic compounds that constituted the intermetallic compound layer in the thickness direction of the clad material was about 7 μm, and thus the thickness of the intermetallic compound layer was about 7 μm. The length of each of the intermetallic compounds in the rolling (longitudinal) direction was 15 μm.

The intermetallic compounds (Al—Fe alloy, for example) that constitute the intermetallic compound layers formed in Example 2 and Comparative Example 2 are sufficiently harder than the Al of which the first layers are made and the Fe of which the second layers are made. Therefore, even if rolling had been performed, the thicknesses of the intermetallic compound layers would not have been reduced. In Comparative Example 2, the intermetallic compounds are fragile, and thus it is believed that the intermetallic compound layer could not follow the rolling, and was divided and formed in a discontinuous manner.

The thicknesses of the intermetallic compound layers are unlikely to be reduced by the rolling, and thus it is believed that the thicknesses of the intermetallic compound layers of the completed clad materials are determined by the first annealing or the second annealing. In other words, it is believed that the thicknesses of the intermetallic compound layers of the completed clad materials are determined by how much the intermetallic compounds grow by the annealing.

Therefore, it is believed that in Example 2 in which the second annealing temperature was lower than that of Comparative Example 2, the growth of the intermetallic compounds was significantly reduced or prevented due to the lower second annealing temperature, and thus the thickness of the intermetallic compound layer became less than 1 μm. On the other hand, in Comparative Example 2, it is believed that the intermetallic compounds grew by the second annealing, and thus the thickness of the intermetallic compound layer became more than 1 μm. From this, the inventor has found that the thickness of the intermetallic compound layer can be reduced to 1 μm or less by setting the second annealing temperature to less than 580° C. (550° C. or less, for example) even when the second annealing is performed after the first annealing.

In Comparative Example 2, the first annealing temperature was set lower than that of Comparative Example 1, the second annealing was performed at the same temperature for a shorter time, and the intermetallic compounds of Comparative Example 2 grew largely and penetrated the first layer (Al layer). From this, the inventor has found that when the second layer is made of Fe, the second layer is more susceptible to the annealing temperature than when it is a Ni layer, and the growth is promoted.

The embodiment disclosed this time must be considered as illustrative in all points and not restrictive. The scope of the present invention is not shown by the above description of the embodiment but by the scope of claims for patent, and all modifications (modified examples) within the meaning and range equivalent to the scope of claims for patent are further included.

For example, while the example in which the clad material 1 for a battery current collector according to the present invention is used for the bipolar electrode 103 of the bipolar secondary battery has been shown in the aforementioned embodiment, the present invention is not restricted to this. The clad material for a battery current collector according to the present invention may be used for a monopolar electrode of a monopolar secondary battery. That is, the positive electrode active material layer or the negative electrode active material layer may be arranged only on one of the first layer and the second layer. The clad material for a battery current collector according to the present invention may be used for a lithium-ion secondary battery using a liquid electrolyte. The clad material for a battery current collector according to the present invention may be used for a positive electrode (or a negative electrode) by forming a positive electrode active material layer (or a negative electrode active material layer) on the surface. The clad material for a battery current collector according to the present invention may be used to connect a positive electrode (or a negative electrode) of a battery to a positive electrode terminal (or a negative electrode terminal) of the battery for a battery terminal.

While the example in which as the method for manufacturing the clad material 1 for a battery current collector, the clad rolling, the annealing (first annealing), the intermediate rolling, the annealing (second annealing), and the final rolling are performed in this order (see FIG. 5) has been shown in the aforementioned embodiment, the present invention is not restricted to this. In the present invention, as the method for manufacturing the clad material for a battery current collector, at least the clad rolling, the annealing (first annealing), and the rolling (final rolling) after the annealing may be performed in this order. That is, the intermediate rolling and the annealing (second annealing) may not be performed between the annealing (first annealing) and the final rolling. Alternatively, the intermediate rolling and the annealing (second annealing) may be alternately performed a plurality of times between the annealing (first annealing) and the final rolling. Alternatively, final annealing (third annealing) may be performed after the final rolling. In this case, a clad material for a battery current collector can be produced in which an intermetallic compound layer having a thickness of 0.1 µm or more and 1.0 µm or less is constituted by an intermetallic compound formed between a first layer and a second layer not in a discontinuous but in a continuous manner.

DESCRIPTION OF REFERENCE NUMERALS

1: clad material for battery current collector
11: first layer
12: second layer
13: intermetallic compound layer
13a: intermetallic compound
111, 111a: first plate material
112, 112a: second plate material
L: unit length

The invention claimed is:

1. A clad material (1) for a battery current collector, the clad material comprising:
a clad material obtained by bonding a first layer (11) made of Al or an Al alloy and in which a positive electrode active material layer is formed on the surface of the first layer, and a second layer (12) made of any one of Ni, a Ni alloy, Fe, and a Fe alloy and in which a negative electrode active material layer is formed on the surface of the second layer, by rolling, the clad material having a thickness of 50 µm or less; wherein
in the clad material, an intermetallic compound layer (13) constituted by an intermetallic compound containing Al and Ni or an intermetallic compound containing Al and Fe, the intermetallic compound layer having a thickness of 0.1 µm or more and 1 µm or less, is formed between the first layer and the second layer, wherein
the intermetallic compound layer is constituted by intermetallic compounds formed in an island shape or a net shape along a rolling direction in a cross-sectional view.

2. The clad material for a battery current collector according to claim 1, wherein in the cross-sectional view, a sum of lengths of the intermetallic compounds in the rolling direction within a unit length in the rolling direction is 50% or less of the unit length.

3. The clad material for a battery current collector according to claim 2, wherein in the cross-sectional view, the sum of the lengths of the intermetallic compounds in the rolling direction within the unit length is 10% or more and 30% or less of the unit length.

4. The clad material for a battery current collector according to claim 1, wherein the thickness of the clad material is 10 µm or more and 30 µm or less.

5. The clad material for a battery current collector according to claim 1, wherein a thickness of the first layer is equal to or smaller than a thickness of the second layer and larger than the thickness of the intermetallic compound layer.

6. The clad material for a battery current collector according to claim 1, wherein the intermetallic compound layer is constituted by intermetallic compounds formed in an island shape along a rolling direction in a cross-sectional view.

7. The clad material for a battery current collector according to claim 1, wherein the intermetallic compound layer is constituted by intermetallic compounds formed in a net shape along a rolling direction in a cross-sectional view.

* * * * *